United States Patent [19]
Griffin

[11] 3,784,427
[45] Jan. 8, 1974

[54] METHOD OF MAKING AND TREATING BIAS CUT FABRIC

[75] Inventor: Thomas Franklin Griffin, Kernersville, N.C.

[73] Assignee: Burlington Industries, Inc., Greensboro, N.C.

[22] Filed: June 3, 1970

[21] Appl. No.: 42,914

[52] U.S. Cl. .................. 156/139, 77/233, 117/7, 156/88, 156/141, 156/185, 156/229, 156/271, 156/308
[51] Int. Cl. ............................. B29h 7/22
[58] Field of Search ............... 156/137, 141, 191, 156/194, 195; 117/7; 74/233

[56] References Cited
UNITED STATES PATENTS

| | | |
|---|---|---|
| 2,519,590 | 8/1950 | Mitchell .................. 74/233 X |
| 1,905,916 | 4/1933 | Leguillon .................. 117/7 |
| 1,323,212 | 11/1919 | Bulley .................. 156/271 X |
| 3,592,709 | 7/1971 | Marzocchi et al. .................. 156/137 |

FOREIGN PATENTS OR APPLICATIONS

| | | |
|---|---|---|
| 337,176 | 10/1930 | Great Britain .................. 156/137 |
| 551,463 | 2/1943 | Great Britain .................. 156/141 |

Primary Examiner—Clifton B. Cosby
Attorney—Cushman, Darby and Cushman

[57] ABSTRACT

A fabric suitable for V-belt covers and hose reinforcing is made by bias-cutting a tubular woven fabric into a continuous strip, stretching the continuous strip in the width direction as with a pin tenter frame to increase the angle between warp and filling to greater than 90°, applying an elastomeric coating, and longitudinally slitting the strip into a plurality of narrower tapes which are then wrapped around a V-belt core in a conventional manner or used as hose reinforcing.

6 Claims, 1 Drawing Figure

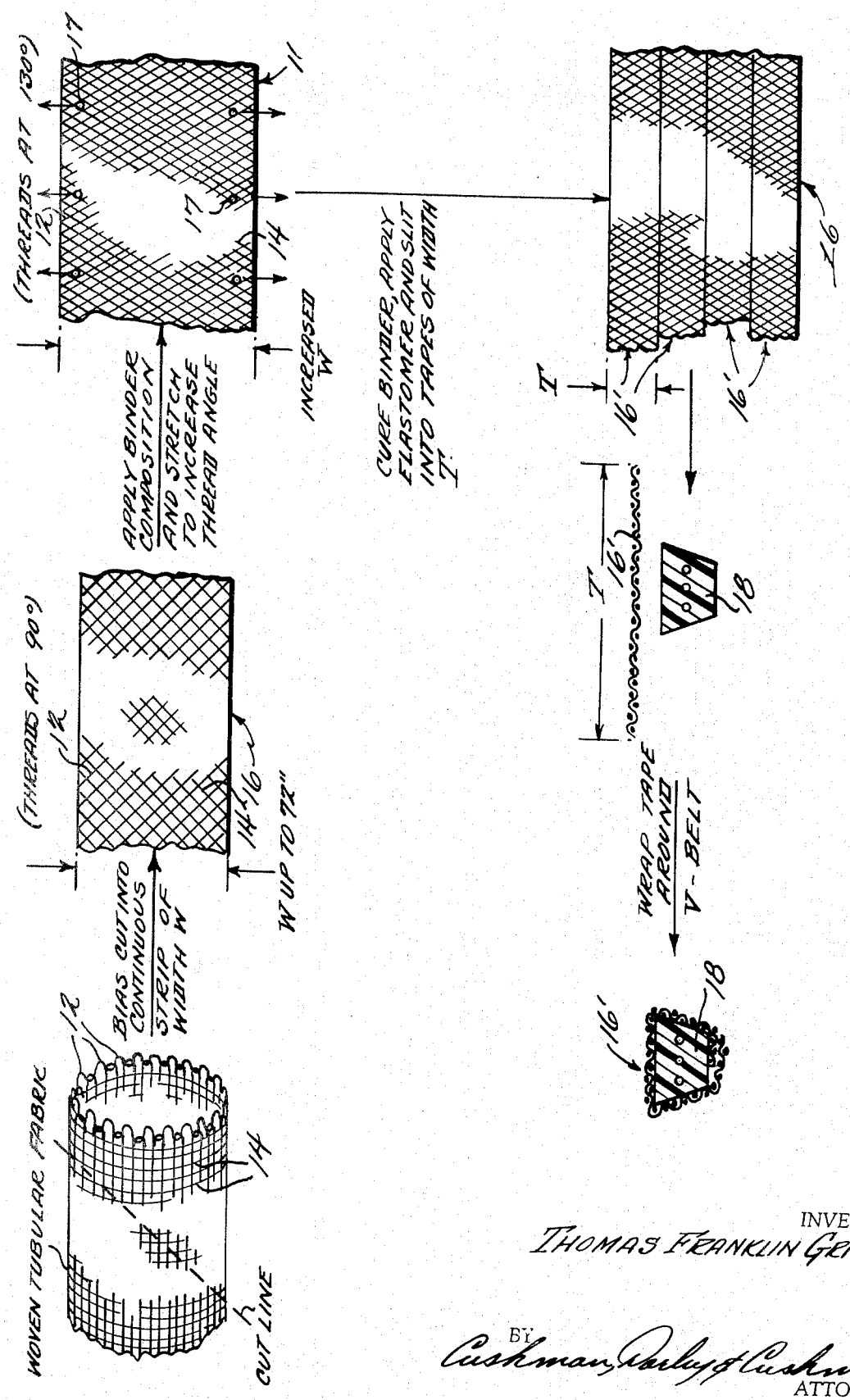

METHOD OF MAKING AND TREATING BIAS CUT FABRIC

This invention relates to industrial fabrics for use as an outer protective fabric cover or wrapper for power transmission belts or as reinforcing for hoses, and in particular it relates to a method of making a bias-cut woven fabric.

Power transmission belts such as V-belts generally include an outer protective woven fabric cover bonded to a reinforced elastomeric core of the belt. Similar fabrics are employed as reinforcing in hose. Normally the initial woven fabric is purchased in relatively broad widths and, after the application of a resinous and/or rubber composition, the fabric is cut on a 45° bias into relatively wide strips between 50 and 60 inches wide. The individual strips are then lap spliced together by overlapping the end of one strip with another approximately ¼ inch, using the tacky rubber compound as an adhesive, and are then wound up into the form of a roll 50 to 60 inches wide and perhaps 100 to 300 yards long. The fabric is then slit longitudinally into relatively narrow tapes of the desired width and length.

The threads in the tapes run at about 45° to the longitudinal dimension of the tapes as a result of the initial bias-cutting step. When the tapes are used to wrap V-belts, the longitudinal dimension of a tape is aligned with the longitudinal axis of the belt core with the result that the angular disposition of the threads to the belt axis is also about 45°. This is highly desirable because, during flexing of the belt in use and the concomitant extension of the belt core, the threads in the cover are displaced from their normal 90° angular relationship with each other and therefore exert relatively little restraint on flexing of the belt. Analogous advantages are obtained when the bias-cut fabric is used as reinforcement in making hose.

More recently it has been suggested by belt makers that an angle of greater than 45° between the cover threads and the belt axis will provide greater flexibility, because during flexing of the belt the threads will be pulled still further out of their normal relationship before they exert their inextensible influence upon flexing of the belt. It will be understood that if the angle of both the warp and the filling with respect to the longitudinal axis of the strip is to be greater than 45°, then the angle between the warp and the filling must be greater than 90°.

The present invention is directed to a method of making bias-cut strips or tapes which does not require the splicing together of individual bias-cut fabric strips and which achieves a desired predetermined large angle between the warp and the filling. These advantages are obtained, broadly, by bias-cutting a tubular woven fabric into a continuous strip, using a cutting angle of between 40° and 50° and controllably stretching the strip in its width direction to increase the angle between the warp and the filling to a predetermined angle greater than 90° and up to about 160°. The stretching operation may be carried out by overfeeding to a pin tenter frame which is adjusted to effect the desired stretch. The strip is then slit longitudinally into tapes of the desired width or wound into a roll for subsequent use.

The accomplished angle should be stabilized, as by applying a resin and/or elastomer containing composition to the fabric at some point in the process, so that subsequent handling does not change the angle and so that the fabric will be compatible with the rubber belt core material or ubber hose material to which it is to be bonded. Preferably a liquid composition, such as a water-based resorcinol formaldehyde composition or a rubber cement, is applied as by dipping prior to the stretching operation, and the composition is heat-cured after stretching to set the resin or evaporate the solvent. It will be understood that the stretching operation involves an angular displacement of warp and filling relative to each other, which is assisted by the lubricating properties of the applied compositions, but that no elongation of the threads occurs. A final application of an elastomeric composition precedes the slitting of the strip into tapes which are themselves, of course, free of splices.

The advantage of the spliceless fabric produced by the process of the present invention is that it avoids many of the problems associated with the use of the conventional spliced fabrics, particularly in V-belt manufacturing which at the present time involves a number of hand operations. For example, quality standards require that no more than a specified number of splices be present in a given belt covering. Also, the presence of splices in the tape often produces a dog ear during wrapping, due to separation of the spliced ends, and this requires that the cover be repaired or discarded and that the wrapping step be repeated. The spliceless fabric of the present invention is therefore well suited to automation in wrapping V-belts, because there is no need to stop the wrapping machinery to repair separated splices.

The invention will be further understood from the following more detailed description of an illustrative embodiment taken with the sole FIGURE which is a flow-sheet illustrating a process for making and wrapping V-belt covers.

As previously stated the first step of the process is to bias-cut a woven tubular fabric 10, having warp 12 and filling 14, into a continuous strip 16 of fabric of width W. The tubular fabric itself may be woven in any conventional manner using, for example, threads of cotton, cotton/nylon or cotton/polyester in conjunction with a four-harness loom or with a circular loom. Conventional equipment may also be used for the cutting operation, it being understood that such equipment is capable of converting a woven tube into a single bias-cut strip the length of which is related to the length and width of the initial tube. The cutting angle should be 40° to 50°, preferably 45°, with respect to the longitudinal axis of the tube. The initial tube may be, for example, 30 to 48 inches in flat width, and the cutting equipment may be adjusted to cut a strip 50 to 60 inches wide. The warp 12 and filling 14 in the strip 16 will be at their normal 90° relationship as in the initial tube, or possibly a little less, and both sets of threads will lie at approximately 45° with respect to the edges of the strip.

In the preferred embodiment the bias-cut strip 16 is then coated or impregnated with a binder composition which serves the purposes of lubricating the threads to assist in the angular change effected in the next operation, stabilizing the adjusted thread angle and enhancing adhesion of the final elastomeric coating to the fabric. The composition may be any of the usual resinous binder compositions normally applied to V-belt fabric, such as a water dispersion of or a solution of resorcinol formaldehyde. The composition may also contain both a resin and an elastomeric component such as neoprene, or it may consist solely of an elastomeric component in a solvent or as a dispersion. Application of the binder composition is conveniently carried out by running the strip 16 through a bath of the composition and squeezing out the excess liquid.

The coated or impregnated strip 16 is then tensioned in the widthwise direction, that is transverse to the longitudinal dimension, to increase the angle between the warp and filling to a value above 90° and up to 160°. Generally an angle of 110° to 135° is preferred. The transverse dimension of the strip 16 is actually increased when the relative thread angles increase, and in this sense the strip 16 is stretched, although there is little or no elongation of the individual threads. At the same time there will be a decrease in the longitudinal dimension of the strip. The tensioning operation can be conveniently carried out by overfeeding the strip in the longitudinal direction to a pin tenter frame, the overfeeding being necessitated by the just-mentioned decrease in length which accompanies the increase in width. As is well known, a pin tenter frame includes a pair of spaced apart driven endless chains each of which carries a series of pins 17 adapted to be attached to one edge of a strip of fabric. In carrying out the present invention the angular disposition of the chains is adjusted to a predetermined diverging angle in the direction of fabric movement so that a controlled, predetermined stretch is imparted to the fabric. This in turn imparts a controlled, predetermined angular relationship between the complementary threads in the fabric.

While the fabric strip 16 is still in the tenter frame or after it has been removed, the binder composition is cured by heating the strip 16 to a temperature which is appropriate to cause the binder composition to set and which is in part dependent on the dwell time in the tenter and on the nature of the fiber. For a resinous composition 300° to 425°F is sufficient to cause the resin to react, and for simple elastomeric solvent cements 120°–250°F is sufficient to drive off the solvent. As a matter of convenience both may be referred to as curing. The warp and filling are thus stabilized within the strip 16 so that subsequent operations will not alter the thread angle which has been imposed.

After curing of the binder composition an elastomeric composition is applied to the strip 16, and the latter is then slit longitudinally into a plurality of tapes 16' of desired width T, for example 3 to 4 inches. The elastomeric composition may be any of those normally employed in impregnating V-belt covers, such as a cement formed from neoprene dissolved in a solvent. The strip may conveniently be run through a bath of the cement and dried prior to slitting.

The coated tapes 16' may then be processed in the usual manner for V-belt covers or for hose reinforcing. As illustrated a length of tape 16' is wrapped around a V-belt core 18 by first aligning the longitudinal dimension of the tape 16' with the longitudinal dimension of the core 18 and then folding the edges of the tape 16' around the core. Following this the wrapped core may be cured in the usual manner.

I claim:

1. A process for making a continuous, spliceless strip of bias-cut fabric in which the angular displacement between warp and filling is greater than 90°, said process comprising: bias-cutting a woven tubular fabric at between 40° and 50° into a continuous strip of fabric; applying a liquid curable binder to the continuous strip; stretching the strip in its width direction to increase the angle between the complementary threads to greater than 90°; curing the binder composition to stabilize the angular positions of the threads; applying an elastomeric coating to the strip; and slitting the strip longitudinally of itself into a plurality of long tapes.

2. A process as in claim 1 wherein the stretching step increases the angle of the complementary threads to between 110° and 135°.

3. A process as in claim 1 wherein said binder composition contains resorcinol formaldehyde.

4. A process as in claim 1 wherein said binder composition is selected from the group consisting of dispersions of an elastomer in a carrier liquid and solutions of an elastomer in a solvent liquid.

5. A process as in claim 1 wherein the stretching step increases the angle of the complementary threads to between 110° and 160°.

6. In the process of making an elastomeric power transmission belt by wrapping a woven fabric cover about an elastomeric core the improvement which comprises: bias-cutting a woven tubular fabric at between 40° and 50° to the longitudinal axis of the tube to form a continuous strip of fabric; applying a liquid curable binder to the continuous strip; stretching the continuous strip in its width direction by applying lateral outward forces to both edges of the strip simultaneously to thereby increase the angle between the complementary threads of the strip to 100° –160°; curing the binder composition to stabilize the angular positions of the threads; applying an elastomeric material to the continuous strip; slitting the continuous strip longitudinally of itself into a plurality of long tapes each of which is of sufficient length to completely cover the elastomeric core when wrapped therearound; and wrapping one of said tapes, without splicing to another tape, around the elastomeric core.

* * * * *